Sept. 25, 1956     L. J. WEBER     2,764,253
APPARATUS FOR THE SEPARATION AND RECOVERY
OF MATERIALS BY ADSORPTION Filed Dec. 10, 1951     2 Sheets-Sheet 1

INVENTOR.
L. J. WEBER
BY
Hudson & Young
ATTORNEYS

Sept. 25, 1956 L. J. WEBER 2,764,253
APPARATUS FOR THE SEPARATION AND RECOVERY
OF MATERIALS BY ADSORPTION Filed Dec. 10, 1951 2 Sheets-Sheet 2

INVENTOR.
L. J. WEBER

BY Hudson & Young

ATTORNEYS

United States Patent Office 2,764,253
Patented Sept. 25, 1956

2,764,253

APPARATUS FOR THE SEPARATION AND RECOVERY OF MATERIALS BY ADSORPTION

Louis J. Weber, Idaho Falls, Idaho, assignor to Phillips Petroleum Company, a corporation of Delaware Application December 10, 1951, Serial No. 260,785

4 Claims. (Cl. 183—4.5)

This invention relates to the separation of gaseous materials. In one of its aspects this invention relates to the separation of low-boiling, normally gaseous hydrocarbons. In another of its aspects this invention relates to the selective adsorption separation of low-boiling normally gaseous hydrocarbons utilizing a selective adsorbent. In still another of its aspects this invention relates to the treating of natural and/or refinery gas streams to separate and recover gasoline and/or low-boiling normally gaseous hydrocarbon materials, such as methane, $C_2$'s, $C_3$'s and/or $C_4$'s.

Selective adsorption processes using selective adsorbents, such as activated charcoal, silica gel, etc., to separate gaseous mixtures into two or more fractions are known in the art. The prior art teaches the use of fixed bed, cyclic fixed bed, and continuous moving-bed processes using various selective adsorbents. However, each of these processes has certain disadvantages. For instance, the known conventional fixed bed processes will not recover hydrocarbon fractions of high purity while recovering a high percentage of the desired component from the feed. The known conventional cyclic fixed-bed processes while being semi-continuous will not recover hydrocarbon fractions of high purity while recovering a high percentage of the desired components from the feed. Continuous moving-bed processes tend to be expensive to operate due to the fact that adsorbent is lost due to attrition as well as by poisoning because of impurities in the material to be separated which impurities cannot readily and/or economically be eliminated so as to reactivate the adsorbent. For example, it is both expensive and difficult to strip $C_5$ and heavier hydrocarbon materials, such as an absorption oil, from activated charcoal. In addition, processes utilizing a moving-bed of activated charcoal, or other materials, which will selectively adsorb hydrocarbon materials or other materials in the separation and recovery of fractions, for instance low-boiling normally gaseous hydrocarbons such as butane, propane, and ethane, are not practical at pressures above about 480 pounds per square inch absolute because of the expense and difficulty in stripping the adsorbed hydrocarbons and in regenerating the selective adsorbent.

For these reasons, selective adsorption separation and recovery of low-boiling normally gaseous hydrocarbon streams using moving-beds of adsorbent is usually carried out at pressures not above about 400 pounds per square inch absolute. Many available hydrocarbon gas streams have pressures of 400 pounds per square inch absolute and higher, and it is not practical to directly separate and recover $C_2$, $C_3$, and $C_4$ hydrocarbons from such high pressure gases by using a moving-bed selective adsorption separation system. There are many natural gas fields, as well as refinery residue gases, existing at the relatively high pressure of from 400 to 5000 pounds per square inch gauge from which it is desirable to recover gasoline and low-boiling normally gaseous materials, such as $C_2$, $C_3$, and/or $C_4$ hydrocarbons. The wet gases from many of these gas fields, particularly those fields of gases at pressures of from 1500 to 5000 pounds per square inch gauge, are treated by a process known as a cycling process, that is, those hydrocarbons and other low-boiling normally gaseous materials which are not removed from the wet gas are returned as dry gas to the field in order to maintain the pressure of the field so as not to lose recoverable hydrocarbons through the phenomenon of retrograde condensation. Since it is expensive to re-pressure the unrecovered hydrocarbons, it is desirable that the gases be available for return to the field at as high a pressure as possible. Also, maintaining pressure in a non-cycling plant is usualy very desirable since residue gases are usually sold or used as fuel and it is usualy desired to produce them at as high a pressure as possible. Further, it is desirable, if possible, to treat the wet field gas at or near its relatively high field gas pressure so that high adsorption pressures, such as pressures from 1000 to 5000 pounds per square inch absolute, may be used in removing $C_5$ and heavier hydrocarbons from the wet field gas. As will hereinafter be set forth, I have invented a separation process which can advantageously be used, in conjunction with and cooperating with an oil absorption system used to remove $C_5$ and heavier hydrocarbons from a wet gas, to separate and recover low-boiling normally gaseous hydrocarbon materials, such as $C_2$'s, $C_3$'s, and/or $C_4$'s from the overhead of a high pressure oil absorber. Pressure is no limitation on the process of my invention. One particularly advantageous application of the process of my invention offers a wet gas treating process requiring very little equipment and eliminating the usual expensive distillation equipment, absorption and re-pressuring equipment found in the usual wet gas treating plant.

My process and apparatus are also effective for separating a mixture of gaseous materials into two or more fractions. A specific embodiment of my invention is a process for separating and recovering a low-boiling hydrocarbon fraction and a lower-boiling hydrocarbon fraction from a gaseous mixture comprising normally gaseous hydrocarbons.

In carrying out one embodiment of my invention I pass a gaseous mixture of materials, said materials possessing varying degrees of adsorbability, such as a mixture of gaseous hydrocarbons into a separation zone or structure containing solid particulate adsorbent matter. I selectively adsorb those materials of said mixture possessing greater tendency to be adsorbed on said solid adsorbent and which materials I normally desire to recover. The unadsorbed and/or less readily adsorbed materials, such as the lower boiling hydrocarbons are withdrawn from the separation zone or structure as an effluent residue gas. The adsorbed materials are removed from said adsorbent as product by the application of heat and may be recovered as substantially pure materials. This recovered product is at least enriched with respect to one component present in said gaseous mixture to be separated. Each of the above-indicated operations is carried out cyclically and concurrently in a closed continuous adsorption zone containing the solid, particulate adsorbent and each operation such as residue gas effluent removal, feed introduction and adsorption, and product removal and heat and stripping of the solid adsorbent, is carried out simultaneously in a definite, defined particular section of said structure. After a predetermined time, depending upon the degree of separation desired or the number of components to be separated or the type of feed employed, etc. the function and purpose of each section within the fractionation structure or adsorption zone is altered and moved forward to another section. Thus, the function of the feed introduction and adsorption section after the lapse of said predetermined time is transferred to that section which immediately prior to this cycle performed a different function, such as residue effluent gas removal. Similarly the function of product gas removal is now carried out in what was immediately prior to this cycle the feed introduction and adsorption section etc. I have discovered that in operating in this manner I can produce substantially pure fractions from a gaseous mixture to be separated, that is, either very pure streams of individual components or very pure fractions of more than one component.

The adsorbed material is preferably removed from the adsorbent by the application of heat thereto. This heat may be supplied by means of an indirect heat exchanger and/or if desired by means of a hot stripping medium or gas. Steam is suitable for use as the stripping medium since it can usually be readily separated from any recovered product and the residue gaseous effluent. Hot product gas or hot gaseous effluent may also be employed as the stripping medium.

I have invented a relatively simple and a very efficient method of treating a gas stream, such as a natural gas and/or a refinery residue gas, for instance a gaseous mixture comprising $C_1$ to more than $C_5$ hydrocarbons and other low-boiling normally gaseous material. My process is particularly adaptable to treating wet gases from a natural gas field, wherein the unrecovered light hydrocarbon gases are returned in order to maintain pressure on the field. If the gaseous mixture to be treated is a natural gas it will usually be comprised of saturated hydrocarbons, while if it is a refinery residue gas it may or may not contain unsaturated hydrocarbons. In carrying out this specific embodiment of the process of my invention I prefer to remove, by absorption, $C_5$ and heavier hydrocarbons from the rich feed gas by using an absorption medium such as a mineral seal oil. The low-boiling normally gaseous hydrocarbon material, usually comprising $C_2$'s, $C_3$'s, and/or $C_4$'s, is then separated and recovered as desired by using the selective adsorption separation process and apparatus of my invention.

One of the principal advantages of my invention is that a very pure low-boiling hydrocarbon material stream can be recovered without the use of a continuous moving-bed selective adsorption separation process which by its very nature breaks up and loses the adsorbent due to attrition. The only appreciable loss of adsorbent occurring in the operation of my invention is through poisoning of the adsorbent, and this loss is relatively low. Also as will be seen hereinafter the process of my invention is not limited as to pressure.

It is an object of this invention to provide a method for the separation of gaseous materials.

It is another object of this invention to provide a method for the separation of low-boiling normally gaseous hydrocarbon materials.

Still another object of this invention is to provide a method for the selective adsorption separation of low-boiling normally gaseous hydrocarbon materials utilizing a fixed bed of a solid adsorbent, such as activated-charcoal, silica gel, etc.

Still another object of this invention is to provide a method for treating a natural and/or refinery residue gas stream to separate and recover, separately, gasoline and low-boiling normally gaseous hydrocarbon materials, such as methane, $C_2$'s, $C_3$'s and/or $C_4$'s.

Other objects and advantages of the process of this invention will become apparent, to one skilled in the art, upon reading this disclosure.

The process of my invention can be used to separate a mixture of materials, such as low-boiling normally gaseous hydrocarbon materials into two or more fractions. Some of the separations to which the process of my invention can advantageously be applied are the treating of low-boiling normally gaseous hydrocarbon materials such as may be separated from natural and/or refinery residue gases to separate and recover relatively pure $C_3$'s and $C_4$'s, or to separate and recover a $C_2$ stream, or a $C_3$ stream, or a $C_4$ stream, or any combination thereof; nitrogen can be removed from natural gas; hydrocarbon synthesis gases can be treated to remove $CO_2$, $H_2S$ and carbonyl sulfides; methane and HCl can be separated; acetylene can be recovered from the products resulting from the partial oxidation of natural gas for the production of acetylene; ethylene can be recovered from gas streams containing same; hydrogen can be recovered from ammonia synthesis recycle bleed gas; etc.

The invention will be better understood and is explained with reference to the accompanying drawings wherein.

Figure 4:
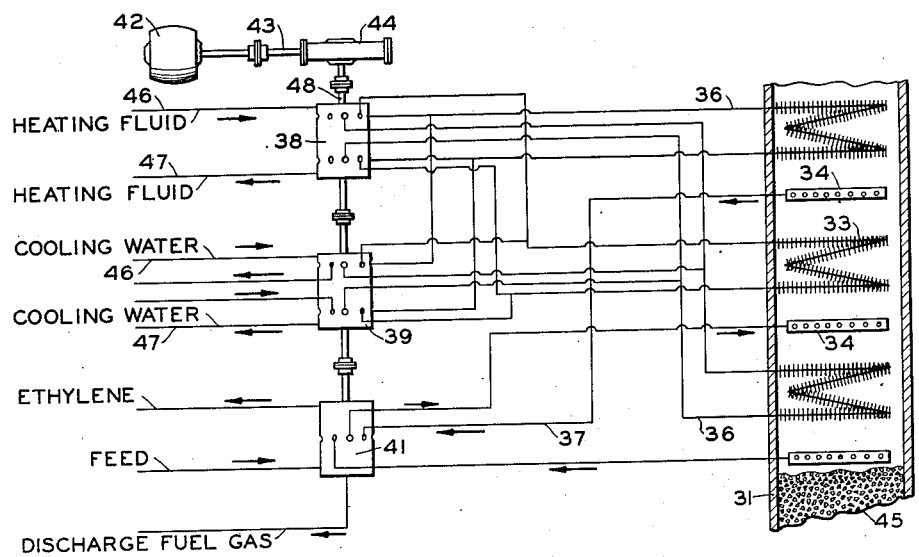

Fig. 4 schematically represents a typical piping arrangement for a number of sections of an apparatus for carrying out my invention.

Figure 1:
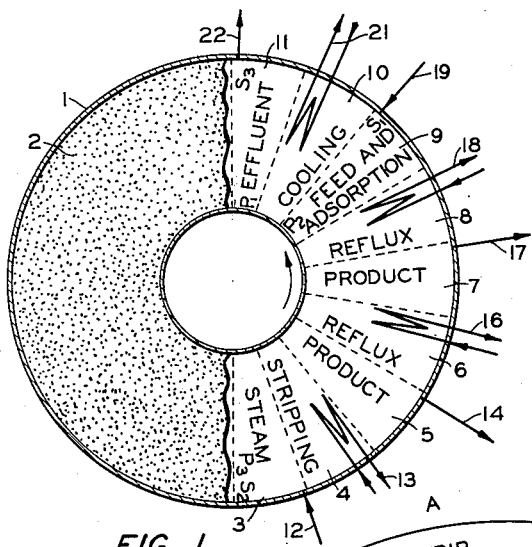
Fig. 1 is a schematic representation of a complete cycle of the operational steps employed in carrying out the operation of this invention.
Figure 2:
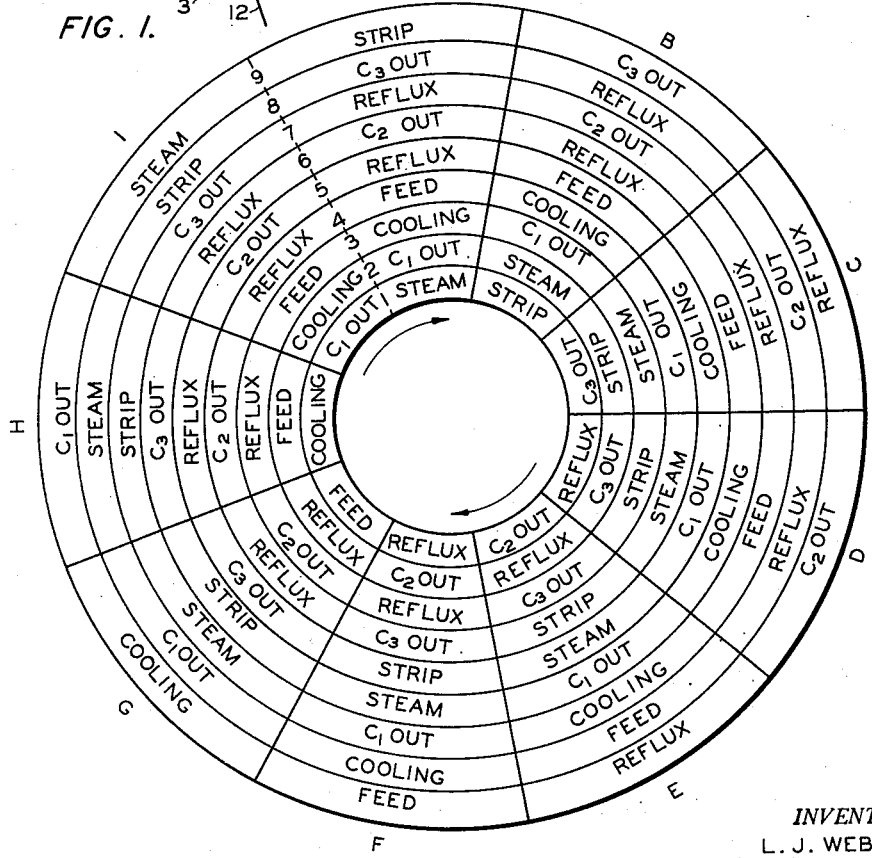
Fig. 2 is a representation of how the particular sections of the structure and their functions are changed when carrying out this invention.

The drawings, Figs. 1 and 2 set forth a preferred embodiment of the process of my invention which operates cyclically. The process depicted by the diagrammatic illustrations of Figs. 1 and 2 is employed to separate a gaseous feed stream into three fractions. One skilled in the art will readily realize that the invention can be used to produce more or less than three product streams, depending upon the gaseous feed mixture, by employing more or less sections within the fractionating structure of my invention. In order to teach one skilled in the art how to carry out the process of my invention, the following discussion pertains to the separation of a gaseous mixture containing three components, X, Y, and Z. Component X being most readily adsorbed on the adsorbent and is usually characterized as relatively high boiling material. Component Y is less readily adsorbed on the adsorbent and is usually characterized as having a lower boiling point than component X. Component Z is the least readily adsorbed on the adsorbent and is usually characterized as possessing the lowest boiling point. Components X, Y, and Z may be characterized and can be considered as being substantially equivalent to propane, ethane and methane, respectively.

Selective adsorption is particularly useful when applied to the separation of gaseous mixtures wherein the more valuable components or the most valuable component is present in relatively minor amounts and wherein the more valuable components or the most valuable component is usually the component or components most readily adsorbed. The least valuable component may be present in a major amount and may be the least readily adsorbed. A typical gaseous mixture which may be advantageously employed in the separation process of this invention is one wherein the least readily adsorbed and/or the least valuable component is present in a major amount, i. e., to the extent of between about 50 and 90 per cent by volume of the gaseous mixture. The remaining portion of that mixture is the more valuable and/or usually the more readily adsorbed component. When applied to a mixture of gaseous hydrocarbon such as a mixture of $C_1$, $C_2$, $C_3$ hydrocarbons a typical gaseous mixture suitable for separation in accordance with my invention would be a gaseous mixture comprising a $C_1$ hydrocarbon (component Z)—50 to 90 per cent by volume, a $C_2$ hydrocarbon (component Y)—10 to 50 per cent by volume, and a $C_3$ hydrocarbon (component X)—5 to 45 per cent by volume.

Referring now to Fig. 1 of the drawings, there is depicted a continuous closed fractionation structure 1. This fractionation structure may have any suitable toroid shape or a square or rectangular shape. Throughout the interior of the closed continuous structure is distributed a solid, particulate selective adsorbent 2 such as activated charcoal, silica gel, or the like, etc. It is pointed out at this time that every portion within the interior of the structure is in direct communication and may be considered to be contiguous with every other portion, there being no barriers which close or encompass any section thereof.

Represented within structure 1 are shown various zones designated in a counterclockwise direction as steam zone 3, stripping zone 4, product zone 5, reflux zone 6, product zone 7, reflux zone 8, feed and adsorption zone 9, cooling zone 10 and effluent zone 11. Fig. 1 illustrates a typical complete operation according to my invention. In zone 3 steam is admitted via line 12 to remove any remaining component X on the adsorbent within the steam zone. Heat is applied in zone 4 by heat exchange means 13 whereby the solid adsorbent within zone 4 is increased in temperature and any adsorbed material therein, such as component X, is desorbed (i. e. the selective adsorbent therein is stripped). Component X is removed as product from zone 5 via line 14. A portion of X however moves into zone 6 which is open and contiguous to zone 5 and on the downstream side in the direction of gas flow (component X). Zone 6 may be fitted with heat exchange means 16 to cause the displacement of component Y from the selective adsorbent therein by heat. Component Y is also displaced from the adsorbent within zone 6 by component X which is more readily adsorbed and therefore displaces component Y. Component Y is removed from zone 7 as product via line 17. Zone 8 is on the downstream side of zone 7 and may be fitted if desired with heat exchange means 18 to drive off any adsorbed component from the adsorbent therein. Displacement of component Z within zone 8 is provided by component Y which is more readily adsorbed by the adsorbent than component Z and consequently displaces component Z therefrom.

Into zone 9 is introduced a gaseous feed mixture containing components X, Y, and Z via line 19. Within zone 9 preferential adsorption of all components takes place. Zone 10 adjoining zone 9 on a downstream side is a cooling zone and is fitted with heat exchange means 21 which is supplied with a suitable coolant to reduce the temperature due to the heat of adsorption of the hydrocarbons within zone 10. Adjoining zone 10 at its downstream side is zone 11 from which the effluent residue gas, component Z, is removed via line 22.

Explanatory of the operation of the invention it is pointed out that the pressure $P_3$ within zone 3 and the pressure $P_2$ within zone 9 and the pressure $P_1$ within zone 11 is such that the gas flow moves in one direction therethrough and as indicated according to Fig. 1 wherein $P_3 > P_2 > P_1$ the net gas flow within the adsorption structure will be in a counterclockwise direction. It is readily seen however, that in the practice of this invention the net gas flow may be in a clockwise direction depending of course upon the disposition of various zones, i. e., if the zones and pressure relationship are reversed in position from what is shown in Fig. 1, the net gas flow would be in a clockwise direction. The point at which feed gas line 19 enters the adsorption structure is designated $S_1$, the point at which steam is introduced into the absorption structure of zone 3 via line 12 is referred to as $S_2$, and the point at which the effluent gas is removed via line 22 is designated $S_3$.

Now considering the operation of a process as schematically exemplified by Fig. 1 there will come a time in each and all of the zones indicated therein wherein its particular function and utility will have been expended or completed, for example in zone 3 there will come a time when there will no longer be any component X to be removed from the adsorbent. In zone 4 there will no longer be any more component X to be stripped from the adsorbent. In zone 5 there will come a time when there will be no longer any component given off from zone 4 to be removed from zone 5, as product component X, and similarly on down through zones 6, 7, 8, 9, 10 and 11. That is, each of these zones will have served its function. When that condition obtains, and according to the invention, all the functions of these zones are moved up to the next adjoining zone on the down stream side of the gas flow, i. e. zone 3 will now be where zone 4 was and zone 4 will now be where zone 5 was, and zone 5 will now be where zone 6 was etc. Thus, steam zone 3 after there is no longer any component X to be removed therefrom, is moved up and its function is carried out in what used to be zone 4 but which now contains a certain amount of X to be removed by a hot gas, such as steam or hot effluent gas.

Before passing on to Fig. 2 which illustrates and sets forth the sequential change of the various zones or steps within the process of the invention as the zones are moved forward according to each new cycle, an opportunity is taken to set forth and explain a feature of this invention whereby as indicated hereinbefore the relationship $P_3 > P_2 > P_1$ exists during the adsorption cycle. In order to prevent the feed gas which is introduced into the adsorption structure via line 19 from being withdrawn with one of the product streams such as with product X or with product Y, it is necessary to maintain the pressure within that section of the absorption structure between the points $S_1$ and $S_2$ at a pressure greater than the pressure which is present within the absorption structure at point $S_1$. This is particularly necessary in the case wherein components X and Y comprise a minor amount of the gaseous feed mixture introduced via line 19. For example, in such a case the volume of the components X and Y initially adsorbed per unit volume of the adsorbent is relatively small, consequently the volume of gas moving through the sections intermediate points $S_1$ and $S_2$, that is, through zones 3, 4, 5, 6, 7 and 8 of Figure 1, is small in comparison with the raw feed gas being processed. Under these conditions the pressure drop through the stripping and refluxing sections (the sections between points $S_1$ and $S_2$) may be less than the pressure drop through the adsorption effluent gas recovery sections such as through zones 9, 10 and 11, that section of the adsorption structure between the points $S_1$ and $S_3$, $S_3$ being that point within the adsorption structure wherein the residue gaseous effluent is removed (see zone 11 on Fig. 1). There will be a tendency for the products, components X and Y to move in an opposite direction, that is in a clockwise direction with reference to Fig. 1. More simply stated the gaseous feed into the adsorption zone would travel in both directions clockwise and counterclockwise within the adsorption structure whereas it is desired to move the gases in one direction only. If such a condition of flow (both directions) should occur the product gases such as X and Y would move around and would pass out of the adsorption structure together with the effluent gas Z via line 22 and would constitute a loss. In order to overcome mixing of these various streams within the contiguous and open adsorbent bed of the adsorption zone, the steam or gas injected into zone 3 via line 12 should be in such a quantity and at such a pressure to maintain a pressure $P_3$ within zone 3 which pressure should be greater than $P_2$ and thus a gas flow in the direction of $P_2$ would occur. That part of the adsorption structure between points $S_2$ and $S_3$, in a clockwise direction on Fig. 1 should be such that the pressure drop of the steam or gas as it moves through this section in a clockwise direction is the same as the pressure drop between points $S_2$ and $S_3$ as the steam or gas moves in a counterclockwise direction. The limit of the section defined by the pressure drop $P_3 - P_1$ in a clockwise direction should be such that the lowest pressure point within the adsorption structure occurs in zone 11 at point $S_3$ wherein the effluent gas is emitted from the adsorption structure. The amount of steam or gas usually required to accomplish the above indicated sealing at point $S_2$ to maintain the proper pressure drop relationship is substantially equal to the gas being processed through the adsorption section. Naturally under conditions wherein a major portion of the feed gas is being adsorbed, such as a gas feed wherein X and Y comprise the major portion of the feed gas, the quantity of sealing steam injected into zone 3 at point $S_2$ to maintain pressure $P_3$ would be substantially reduced.

As an alternative to the employment of a sealing gas and as an added feature of this invention it is possible and in some instances it is preferable to employ an impermeable barrier at various alternative points within the adsorption structure. For example, with reference to Fig. 1 to employ gas tight, impermeable barriers at points $S_2$ and $S_3$, to prevent any gas flow upstream from points $S_2$ and downstream from $S_3$ with respect to the normal gas flow. If an impermeable barrier were to be employed at points $S_2$ and $S_3$ to completely seal off one or more sections and cut through the adsorption zone it should not be necessary to have what amounts to a dead space between the points $S_2$ and $S_3$ in a clockwise direction, still referring to Fig. 1. This space between $S_2$ and $S_3$ is called a dead space because no separation of gas is taking place therein but rather its sole contribution to the process is to create the proper pressure drop relationship in a counterclockwise direction ($P_3 > P_2 > P_1$) in order to avoid loss of product to the effluent gas. This can be accomplished by the employment of barriers at points $S_2$ and $S_3$. In the complete cycle of carrying out the process of the invention employing barriers it is necessary to space barriers and distribute these removable impermeable barriers throughout the adsorption structure so as to be able to seal off each of the sections. This will be better understood and quickly appreciated when Figure 2 is considered.

Fig. 2 illustrates how each zone within the adsorption structure hereinbefore described with reference to Fig. 1, functions cyclically, in the operation of the invention. Considering now the steam zone such as zone 3 of Fig. 1 wherein component X is completely removed from the adsorbent therein, the time sequence should be such and the operation should be carried out such that about the same time is required for the complete removal of component X from zone 3 as the amount of time is required for each and all the other gases within the adsorption structure to complete their particular function and operation. When this time has elapsed each zone together with its particular function is moved forward. Stated with reference to the stripping zone (see zone 4 of Fig. 1 or segment B of Fig. 2) the stripping zone of the first complete cycle (B—1 of Fig. 2) would now become the zone into which steam is admitted.

Set forth in Fig. 2 are various zones of an adsorption structure which may be employed to carry out a process of my invention for the separation of a three component gaseous mixture such as X, Y and Z. Each segment of the chart in Fig. 2 represents a zone. The numbers extending radially from the center of the chart on Fig. 2 indicate a complete cycle. Thus, since there are nine zones it will require nine operational changes before a zone returns to the same function it performed at the beginning of the first cycle. Following the feed zone of the first cycle i. e. segment G of Fig. 2, which in cycle number 1 performs the function of a feed adsorption zones within the adsorption structure, segment G after the completion of cycle 1 during which it functioned as a feed adsorption zone, has a new function during cycle number 2. During cycle number 2 this same section within the adsorption structure (still segment G of Fig. 2) functions as a reflux zone. As before, after the completion of cycle number 2, cycle number 3 is started and this same section now serves as an outlet for one of the products, for example, component Y as identified hereinbefore with reference to Fig. 1. After the completion of the 3rd cycle, a 4th cycle is started. During this 4th cycle this same section, segment G serves as a reflux zone. After the completion of the 4th cycle the 5th cycle is started and this same section, segment G, now serves as a product take off zone, that is a section wherein product such as component X is taken off. Upon completion of cycle number 5, cycle 6 is started and again this same section serves a new function. During cycle number 6 this same zone, segment G, now acts as a stripping section. After completion of cycle 6, cycle 7 starts and this same section now serves as a steaming section or product removal section. After cycle number 7, cycle number 8 occurs and this same section now is used as the effluent gas removal section. Upon the completion of cycle 8, cycle 9 commences and this same section now serves as the cooling section. Thus, 9 complete cycles have now occurred and as set forth and according to Fig. 2, the segment G is now ready to return to the same function it possessed and carried out in cycle number 1. Accordingly commencing on the 10th complete cycle, this same zone as represented by segment G of Fig. 2 would now serve as a feed adsorption section.

According to Fig. 2 there are set forth 9 complete cycles and 9 zones within the thus-represented adsorption structure. It is pointed out again that applicant's process as demonstrated and/or illustrated by Figs. 1 and 2 represent one embodiment therein and that depending upon the feed mixture to be separated more than 9 or less than 9 zones or sections within the adsorption structure may be required. For example, if a two component feed mixture was to be separated about 7 sections would be sufficient. Furthermore, it is pointed out that some of the zones or sections represented in Fig. 1 and Fig. 2 may be combined into one zone or section. For example, the section represented by segment H, cycle 1 of Fig. 2, wherein cooling occurs may be advantageously combined with segment I, cycle 1, into a single zone. This modification could be advantageously made since the effluent gas is relatively cool and could therefore serve as a cooling means for the section represented by segment H in cycle 1. Accordingly, only considering cycle 1 of Fig. 1, the zones represented by segments H and I of Fig. 2, that is the cooling and effluent gas outlet zone (component Z recovery) respectively, can be combined into one zone. Similarly, still considering cycle 1 of Fig. 2 the steam and stripping zones represented by segments A and B respectively may also be combined if desired since the hot steam or hot sealing gas could be used not only to strip and remove any valuable component from the adsorbent therein but the same steam or gas used can also serve as a sealing gas. Similarly the product recovery and reflux zones of cycle 1, represented by segments C, D, E and F may also be advantageously combined depending upon the degree of separation desired.

Opportunity is taken at this time to point out that the gas flow in the process represented by the sequence of operational steps set forth within the various cycles of Fig. 2, takes place in a clockwise direction and that the forward movement or change of the various functions of these segments are similarly transferred to their adjoining sections and similarly takes place in a clockwise direction i. e. gas flow and operation changes move in the same direction. However, the gas stream and sequence of operational steps may also move in a direction opposite that shown in Fig. 2, that is a counterclockwise direction depending of course upon the disposition and arrangement of the operational steps performed within each cycle.

Referring again to Fig. 2 it should be noted that each of the operational steps set forth therein within any one of the indicated cycles, i. e., stripping, product removal (such as component X), reflux, product removal (component Y), reflux, feed adsorption, cooling, effluent gas removal (component Z), and steaming, can all be effected by heat exchange means and by a gas collecting or distributing means. Considering each of the above-indicated operational steps separately it is readily seen that stripping can be accomplished by admitting steam (this steam would also serve as a sealing gas and if desired a hot effluent gas or any hot gas may be employed in place of steam) can be accomplished by a gas or steam distributing means within that zone. The application of heat will also accomplish stripping and refluxing; similarly the removal of heat will accomplish cooling. Product removal (component X recovery) can be accomplished by a gas collecting means. Both the gas collecting means and the gas distributing means may be one and the same kind of apparatus as may be readily realized by one skilled in the art. Reflux may be carried out by the addition of heat to that particular zone and this addition of heat can most readily be accomplished by any suitable heat exchange means. Product removal (component Y recovery) can be accomplished by a gas collecting means. Similarly effluent gas removal (component Z recovery) as well as steaming can be accomplished by a gas collecting and distributing means respectively. Feed introduction can also be accomplished by a gas distributing means. It is of course readily realized that cooling can be accomplished by a heat exchange means. Thus, we see that each zone can be made to perform the function of every other zone provided each zone has the proper combination of apparatus preferably both a gas distributing or collecting means and a heat exchange means, since the only apparatus involved in the sequence of operational steps are (1) gas distributing or collecting means (which may be one and the same possible apparatus) and (2) heat exchange means which can serve as a heating or cooling device depending upon the temperature of the fluid and/or heat exchange medium passed therethrough. Accordingly therefore if each zone had therein a heat exchange means and a gas collecting or distributing means, each zone can accomplish the function of every other zone.

Of course I do not contemplate nor should my invention be so restricted that each zone have only one heat exchange means or only one gas collecting or distributing means. Often it may be desirable to employ one or more heat exchange means and/or one or more gas distributing or collecting means within a zone. For example, during a refluxing step it may be desirable to employ a plurality of heat exchange means therein. Similarly in the feed adsorption zone it may be desirable to employ a plurality of gas distributing units therein. In one preferred embodiment of my invention, however, I prefer that all the sections or zones within the adsorption structure should contain a heat exchange means and a gas distributing or collecting means. In another preferred embodiment of my invention I prefer that the heat exchange means and/or gas collecting means be arranged and distributed alternately within and throughout the entire adsorption structure. By a proper and suitable arrangement of piping and valves during any one cycle, one or more distributing means will be passing gas into the adsorption structure, one or more gas collecting means will be recovering product or effluent gas therefrom, one or more heat exchange means will be heating the adsorbent and one or more heat exchange means will be cooling the adsorbent. Similarly by a suitable arrangement of piping and valving all the different operations can be carried out simultaneously and sequentially arranged and cyclically changed in the manner as indicated by Fig. 2.

Figure 3:
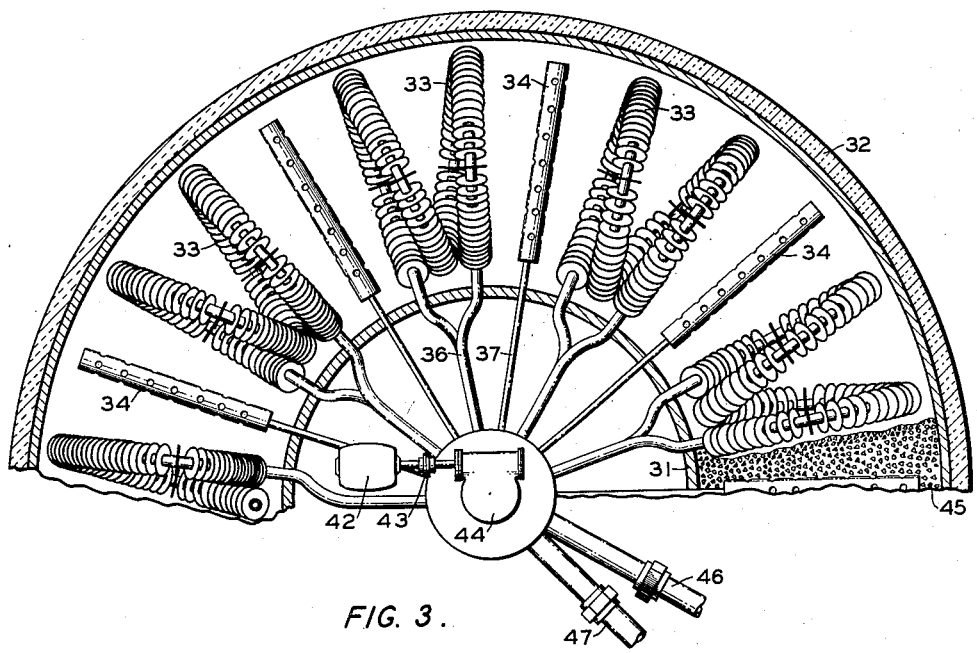
Fig. 3 is one embodiment of the invention which illustrates a suitable apparatus for carrying out the invention.

In order to better understand the invention, reference is now made to Figs. 3 and 4. Referring now to Figure 3 therein is depicted an adsorption zone or structure which is in the shape of a toroid such as a doughnut or continuous hollow ring 31. Any suitable structure which defines a closed continuous space or interior may be used, such as a toroid structure, a torus, etc. A structure square or rectangular in cross section and in plan can also be used as may be convenient or desirable. Structure 31 may also be made of any suitable material of construction such as steel and should of course be of sufficient strength to withstand the desired operating pressure. Hollow-ring structure 31 is preferably insulated externally by an insulating layer or surface such as indicated at 32 and is provided with a number of heat exchange means 33 (for heating or cooling) and with a number of gas collecting or distributing means 34. Means 33 and 34 are preferably alternately spaced apart within the hollow ring. It is pointed out at this time that during the operation of this apparatus as an adsorption zone the entire interior is completely filled with solid particulate adsorbent materials 45, such as activated charcoal or silica gel, etc. If desired heat exchange means 33 may be provided with finned tubes or with any other type of heat exchange surfaces and preferably should be of such design as to give optimum heat transfer between the heat exchange means and the ambient solid particulate adsorbent matter in contact therewith. Gas distributing means 34 which as indicated hereinbefore also serves as a gas collecting means may be of any suitable size and design such as slotted pipes, inverted angles, open and/or perforated tubes, perforated rings or the like. Heat exchange means 33 and gas distributing means 34 are connected via line 36 and 37 respectively to suitable distributing devices or switching valves such as switching valves 38, 39 and 41 shown in Fig. 4. Valve 38 is preferably a multi-port plug-type valving device which controls the flow of heat exchange fluid to heat exchange means 33. Valve device 39 is also a multi-port valve similar to means 38 and suitable for controlling the flow of a cooling fluid to heat exchange means 33. Valve device 41 is also a multi-port valve suitable for controlling the flow of gas to distributing means 34 and the recovery of gas from means 34, such as in the manner as shown in the drawing of Figs. 3 and 4. Valve devices 38, 39 and 41 may be driven through motor 42, connected by shaft 43 which in turn drives speed reducer 44 which is connected via shaft 48 to operate valving devices 38, 39 and 41. Steam, Dowtherm, hot gas or vapor or any other heating medium or any cooling medium such as cooled Dowtherm or water may be received into valving devices 38, 39 via conduit 46 and is received from valving device 38 and 39 via conduit 47.

The apparatus and illustrative process of the invention as set forth in Fig. 4 is suitable for the recovery of ethylene (which is readily absorbed upon activated charcoal) from a fuel gas (which is less readily absorbed upon charcoal). By a suitable arrangement of valve device 41, the ethylene fuel gas admixture can be admitted into the adsorption zone via distributing means 34 and at the same time substantially pure ethylene product and effluent fuel gas are received from other collecting means 34 through valving device 41 in the manner indicated in Figure 4. By employing valving devices which serve the same function as valve devices 38, 39 and 41 and/or which operate in the same manner it is possible to accomplish the many fluid switching operations required to carry out the cooling operation, feed-absorption operation, the refluxing operation, the heating operation, the product recovery operation, the stripping operation, etc., and at the same time keep these operations moving around and around the vessel at any predetermined rate in the manner indicated in Figs. 1 and 2. It is obvious that it is possible to carry out the many valve switching operations by employing a mechanically or electrically-timed pneumatically or electrically operated valve system.

The process of my invention can be operated manually or automatically. If automatic operation is desired, the various cycles can be either time controlled, controlled by analysis of physical properties of the effluent streams, for instance, analysis for specific gravity, heating value, etc., or controlled by the selective adsorbent bed temperatures which give a good indication of the particular component being adsorbed at any particular point in the bed.

Any particle size adsorbent can be used which doesn't, of course, create an excessive pressure drop across or cause plugging of the separation zone or which is not too large to reduce the adsorptive capacity to a great extent. However, I prefer to use activated charcoal, having a particle size of from 5 to 60 mesh. In operations wherein maintaining a relatively high pressure on the residue gas is not desired or necessary, I prefer to carry on $C_3$, $C_4$ or $C_3$ and $C_4$ adsorption at a temperature of from 50 to 250° F. and at a pressure of from atmospheric to 250 pounds per square inch absolute, although pressures up to 5000 p. s. i. g. may also be used. Likewise, if maintaining residue gas pressure is not desired or necessary, I prefer to carry on $C_2$, or $C_2$ and $C_3$ adsorption at a temperature of from 50 to 150° F. and at a pressure of from atmospheric to 250 pounds per square inch absolute or higher. If $C_2$, $C_3$ and $C_4$ adsorption is carried on, I prefer to adsorb at a temperature of from 50 to 250° F. and at a pressure of from atmospheric to 250 pounds per square inch absolute. In the refluxing step of the process of my invention, I prefer to reflux at a temperature of from 50 to 250° F. for $C_3$ and/or $C_4$ refluxing and at a temperature of 50 to 150° F. for $C_2$ and/or $C_3$ refluxing, and at a pressure of from atmospheric to 250 pounds per square inch absolute or higher in both cases. In the case where $C_2$, $C_3$ and $C_4$ adsorption is carried on at the same time, I prefer to carry on refluxing at a temperature of from 50 to 250° F. and at a pressure of from atmospheric to 250 pounds per square inch absolute. I prefer to strip, reflux or desorb the $C_3$, $C_4$, or $C_3$ and $C_4$ fractions at a temperature of from 325 to 700° F. and at a pressure of from atmospheric to 40 pounds per square inch absolute, and I prefer to strip or desorb the $C_2$ or $C_2$ and $C_3$ fractions at a temperature of from 200 to 550° F. and at a pressure of from atmospheric to 40 pounds per square inch absolute. In the cooling step of the process of my invention, I prefer to cool the adsorbent beds to a temperature of from 35 to 250° F. If the adsorbent beds become poisoned due to impurities in the feed such as $C_5$ and heavier hydrocarbons, which are not removed in the stripping operation, I find that the adsorbent can be regenerated, the regeneration being carried on at a temperature of from 650 to 1150° F. and at a pressure of from atmospheric to 25 pounds per square inch absolute or higher.

As will be obvious to those skilled in the art many modifications, improvements and changes may be made without departing from the spirit and scope of this disclosure and invention.

I claim:

1. Apparatus of the class described comprising a closed, continuous, ring-shaped shell; a fixed bed of solid particulate adsorbent material disposed within the entire chamber encompassed by said shell; a plurality of spaced apart heat exchange means radially positioned within said chamber and disposed within said adsorbent material; a plurality of gas collecting and distributing means, each of said latter means being positioned within said shell between a pair of said heat exchange means; first conduit means connected to each of said heat exchange means; and second conduit means connected to each of said gas collecting and distributing means and extending outside of said shell for fluid introduction and withdrawal.

2. The apparatus of claim 1 in which means are provided for controlling the flow of heat exchange fluid through said first conduit means so that each of said heat exchange means is provided with fluid of a desired temperature during predetermined periods of time and in which means are provided for controlling the flow of fluid through said second conduit means so that each of said gas collecting and distributing means alternately supplies gaseous feed materials to said fixed bed of adsorbent material and removes gaseous materials from said fixed bed during predetermined periods of time.

3. The apparatus of claim 1 in which said shell has a circular cross section.

4. Apparatus of the class described comprising a hollow closed continuous ring-shaped means; a fixed bed of solid particulate adsorbent material disposed within the entire hollow space of said ring-shaped means; a plurality of spaced apart heat exchange means radially positioned within said ring-shaped means and disposed within said adsorbent material; a plurality of gas collecting and distributing means each of said latter means being positioned within said ring-shaped means between a pair of said heat exchange means; first conduit means connected to each of said heat exchange means; and second conduit means connected to each of said gas collecting and distributing means and extending outside of said ring-shaped means for fluid introduction and withdrawal.

References Cited in the file of this patent

UNITED STATES PATENTS

| | | |
|---|---|---|
| 1,602,500 | Nuss | Oct. 12, 1926 |
| 1,717,103 | Godel | June 11, 1929 |
| 1,787,714 | Barneby | Jan. 6, 1931 |
| 1,875,199 | Parkman | Aug. 30, 1932 |
| 2,083,732 | Moore et al. | June 15, 1937 |
| 2,222,828 | Guthrie | Nov. 26, 1940 |
| 2,349,822 | Gardner | May 30, 1944 |
| 2,507,608 | Miller | May 16, 1950 |
| 2,519,874 | Berg | Aug. 22, 1950 |
| 2,529,289 | Gilliland | Nov. 7, 1950 |
| 2,590,322 | Imhoff et al. | Mar. 25, 1952 |
| 2,612,656 | Lyon | Oct. 7, 1952 |
| 2,635,707 | Gilmore | Apr. 21, 1953 |
| 2,635,988 | Crowley | Apr. 21, 1953 |